3,027,301
THERAPEUTIC WOUND HEALING COMPOSITION OF HYDROXYPROPYLAMIDES OF HYDROXYBENZOIC ACIDS
Louis Freedman, Bronxville, and Seymour L. Shapiro, Hastings on Hudson, N.Y., assignors to U.S. Vitamin & Pharmaceutical Corporation, a corporation of Delaware
No Drawing. Continuation of applications Ser. No. 565,542, Feb. 15, 1956, and Ser. No. 671,395, July 12, 1957. This application Mar. 16, 1959, Ser. No. 799,451
4 Claims. (Cl. 167—65)

The invention relates to a composition of matter and a method for its preparation. More particularly, it pertains to a composition containing a 3-hydroxypropylamide and includes correlated improvements and discoveries which accord compositions having distinctive properties.

An object of the invention is the provision of a composition of matter in which the principal and essential ingredient is a 3-hydroproxypropylamide.

A further object of the invention is the provision of a composition containing a 3-hydroxypropylamide and which may be prepared readily, efficiently and economically.

A particular object of the invention is to provide new compounds which are derivatives of 3-hydroxypropylamine.

The invention accordingly comprises a composition of matter possessing the characteristics, properties and the relation of constituents and a method which comprises the several steps and the relation of one or more of such steps with respect to each of the others thereof, which will be exemplified in the composition and in the method hereinafter in the claims.

In the practice of the invention, 3-hydroxypropylamides are obtained by reaction of 3-hydroxypropylamine and a hydroxybenzoic acid, and are represented by the formula

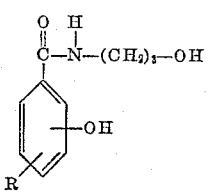

wherein R is a member of the group consisting of hydrogen, hydroxyl, alkyl, e.g. having a carbon content of $C_1$–$C_3$, halogen and aryl. In addition the phenolic hydroxy group may be converted to, or may be present as an alkoxy group, e.g. having a carbon content of $C_1$–$C_3$.

These compounds have useful therapeutic properties, particularly as wound healing agents as will be disclosed below.

Typical compounds of this invention are given in following Table I.

TABLE I

*3-Hydroxypropylamides of Substituted Benzoic Acids*

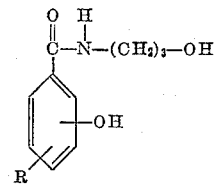

| R | OH | M.P., °C. | B.P., °C./mm. press. | Formula |
|---|---|---|---|---|
| H | 2-OH | 55–56 | 200/2 | $C_{10}H_{13}NO_3$ |
| H | 4-OH | 119–20 | | $C_{10}H_{13}NO_3$ |
| H | 4-OCH$_3$ | 64.5–65 | | $C_{11}H_{15}NO_3$ |
| 4-OH | 2-OH | 149–151 | | $C_{10}H_{13}NO_4$ |
| 5-OH | 2-OH | 134–5 | | $C_{10}H_{13}NO_4$ |
| 3-CH$_3$ | 2-OH | 71–2 | | $C_{11}H_{15}NO_3$ |
| 5-Cl | 2-OH | 102–103 | | $C_{10}H_{12}NO_3Cl$ |
| 5-C$_6$H$_5$ | 2-OH | 93 | | $C_{16}H_{17}NO_3$ |

These derivatives of 3-hydroxypropylamide may be prepared by amidation using 3-aminopropanol as the amine component and acids, esters, or acid chlorides as the source of the acyl component. Generally, the reactants may either be mixed in desired mole ratios and heated at a controlled temperature to complete reaction, or an inert solvent may be added when the reaction is particularly vigorous in order to modify it.

Further, the procedures are such with reference to 3-aminopropanol that reaction takes place selectively with respect to the amino group rather than the hydroxyl group.

As an illustrative embodiment of procedures by which the 3-hydroxypropylamides may be prepared, the following examples are presented.

EXAMPLE I.—N-(3-HYDROXYPROPYL)-SALICYLAMIDE

Methyl salicylate (22.8 g., 0.15 m.) is mixed with 13 g. (excess) of 3-aminopropanol and heated on the steam bath for 4 hours. The cooled residue is shaken with 100 ml. of ether and 30 ml. of water, faintly acidulated with 1 N-hydrochloric acid, and the aqueous layer discarded.

The ether solution is washed with three 30 ml. portions of saturated sodium chloride, the ether layer separated, and the ether removed. The residue, 24.5 g. is distilled, there being obtained a viscous oil having a boiling point 200° C./2 mm. The oil crystallized on standing, and recrystallizing from methylal afforded crystals, M.P. 55–56° C.

Found: C, 61.6; H, 6.8; N, 7.2.
Analysis: Calcd. for $C_{10}H_{13}NO_3$—C, 61.5; H, 6.7; N, 7.2.

EXAMPLE II.—N-(3-HYDROXYPROPYL)-p-HYDROXYBENZAMIDE

A mixture of 8.3 g. (0.05 m.) of ethyl-p-hydroxybenzoate and 10 ml. of 3-aminopropanol (excess) is heated in an oil bath at 150° C. for 6–7 hours. The completion of the reaction is indicated by adding a few drops of the mixture to water and acidifying with hydrochloric acid without any precipitate of ethyl-p-hydroxy-benzoate being formed. This reaction mixture is dissolved in 30 ml. of water; acidified with dilute hydrochloric acid, and extracted with 50 ml. of ethyl acetate. The extraction is repeated six times with 30 ml. portions of ethylacetate.

Upon evaporation of the ethylacetate extracts a crystalline product is obtained. Recrystallization is effected by dissolving the product in 125 ml. of boiling ethylacetate, filtering and allowing to cool slowly at room temperature, and then at 10° C., M.P. 119–120° C.

Found: C, 61.8; H, 7.2; N, 7.0.

Analysis: Calcd. for $C_{10}H_{13}NO_3$—C, 61.5; H, 6.7, N, 7.2.

EXAMPLE III.—N-(3-HYDROXYPROPYL) AMIDE OF 5-CHLORO-2-HYDROXY-BENZOIC ACID

A mixture of 9.33 g. (0.05 m.) of methyl-5-chlorosalicylate and 5.0 g. (0.067 m.) of 3-aminopropanol is heated under reflux for four hours. The cooled reaction product is treated with 50 ml. of water and 7 ml. of 3 N-hydrochloric acid; the formed solid removed by filtration and dried. On recrystallization from ethylacetate-hexane there is obtained a product having M.P. 102–103° C.

Found: C, 52.3; H, 5.0; N, 6.3.

Analysis: Calcd. for $C_{10}H_{12}NO_3Cl$—C, 52.3; H, 5.3, N, 6.1.

EXAMPLE IV.—N-(3-HYDROXYPROPYL) AMIDE OF p-ANISIC ACID

To a stirred solution of 7.5 g. (0.1 m.) of 3-aminopropanol and 10.1 g. (0.1 m.) of triethylamine in 150 ml. of acetonitrile there is added over a 45-minute period a solution of 17.1 g. (0.1 m.) of p-anisoylchloride in 50 ml. of acetonitrile. Stirring is continued for 1.5 hours. The reaction mixture is cooled at −10° C. and upon filtration a mixture of product and triethylamine hydrochloride separates. The filtrate and acetone leachings of the precipitate, which separated the product from the acetone insoluble triethylamine hydrochloride, are combined and evaporated to dryness. The residue is taken up in 75 ml. of water, extracted with ether—to remove any undesirable organic products such as anisic acid—and then the aqueous phase is extracted with five successive 50 ml. portions of ethylacetate. Evaporation of the ethylacetate extracts yields a solid which is redissolved in 100 ml. of ethylacetate and treated with 40 ml. of hexane, followed by an additional 60 ml. of hexane after most of the product has crystallized. After 2 hours the crystallized product is filtered off, M.P. 64.5–65° C.

Found: C, 63.4; H, 7.4; N, 6.8.

Analysis: Calcd. for $C_{11}H_{15}NO_3$—C, 63.1; H, 7.2; N, 6.7.

The 3-hydroxypropyl amides have been found to have valuable properties as wound healing agents.

The compounds of this invention may advantageously be utilized in the form of a cream. The cream base may be hydrophilic, or hydrophobic, or a vanishing cream base. The active ingredient may be varied and we have found that creams containing from about 0.5 to 5.0% of the active ingredient give satisfactory results. The examples which follow are illustrative of methods for incorporating 3-hydroxypropylamides into creams and are offered as examples of the spirit and scope of this invention, and are not to be construed as limiting.

EXAMPLE A.—2% OF N-3-HYDROXYPROPYL-p-HYDROXYBENZAMIDE IN AN OINTMENT

A mixture of 15.0 g. of cetyl alcohol, 5.0 g. of spermaceti, 0.05 g. of methyl-p-hydroxybenzoate, 0.03 g. of propyl-p-hydroxybenzoate are heated with stirring to 80° C. and added to a mixture of 1.0 g. of sodium lauryl sulfate, 5.0 g. of glycerin and 71.72 g. of water in which 2.0 g. of N-3-hydroxypropyl-p-hydroxybenzamide have been dissolved at 70° C. The mixture is allowed to cool to 60° C., and, if desired, 0.1 g. of menthol and 0.1 g. of camphor may be added. The mixture may then be cooled to 55° C. and placed in tubes and jars.

The compositions such as these just above described, containing a derivative of 3-hydroxypropylamide, have been found to be efficacious for the healing of wounds, and such is evidenced by the following typical results.

Guinea pigs were treated as follows: The hair of the back was shaved and four equally spaced areas selected and treated with 2 drops of 50% trichloroacetic acid which was permitted to air dry. An ulcerous lesion appeared within three days which increases in severity and which heals within an average of about 23 days. An additional application of trichloroacetic acid was made 16 days after the initial application, and treatment was initiated 22 days after the initial application, i.e. six days after the second application of the 50% trichloroacetic acid. The composition was applied each day by rubbing a small quantity gently onto and about the wound area using a gentle rotary motion.

Healing is defined as the disappearance of the ulcer or lesion and its entire replacement by fresh looking pink tissue.

Trichloroacetic Acid Wounds—Percentage of Wounds Healed

| Composition containing | No. of Wounds | Days After Wounding | | | | |
|---|---|---|---|---|---|---|
| | | 7 | 11 | 12 | 13 | 14 | 15 |
| N-(3-hydroxypropyl)-p-hydroxybenzamide (2%) | 11 | 0 | 45 | 77 | 100 | 100 | 100 |
| Cream base (control) | 11 | 0 | 9 | 36 | 72 | 82 | 82 |

Another type of wound was produced by intradermal injection of guinea pigs with mercurophyllin U.S.P. using 0.1 cc. at each site. If observation the following day showed insufficient wounding, an additional 0.1 cc. of mercurophyllin was injected. After 2–3 days a lesion was obtained characterized by a turtle-shell scab. The composition was applied each working day starting two days after the initial injection. In addition to a control group treated with the cream base, a group was introduced which was treated only by rubbing with a small amount of water.

Mercurophyllin Wounds—Percentage of Wounds Healed

| Composition containing | No. of wounds | Days After Wounding | | | |
|---|---|---|---|---|---|
| | | 20 | 22 | 24 | 28 |
| N-(3-hydroxypropyl)-p-hydroxybenzamide 2% | 6 | 0 | 17 | 50 | 83 |
| Control Cream | 6 | 0 | 0 | 33 | 67 |
| No treatment | 4 | 0 | 0 | 25 | 50 |

The foregoing evidences that the 3-hydroxypropylamide compositions are particularly effective with respect to aggravated and long-standing wounds, erythemas, and ulcerations which are not mere cuts or clean abrasion.

The 3-hydroxypropylamides hereinabove described are readily dispersed within a base material, such as a hydrophilic base, yielding compositions having good absorption of the amide at the wound site. The compositions are applied externally at the site of the wound and effect an increased rate of healing by what is believed to be the provision of an environment which is less susceptible to the stress factors and to the inhibition factors which occasion delay in healing.

The compositions of the present invention are non-toxic and relatively non-irritant and provide active centers capable of modifying tissue reactions. We have found that the pH value of the ointment may be varied from about 5.9 to about 7.5. Further, it was our finding that with these novel compositions, when compared with untreated controls with respect to non-surgical wounds, as those occasioned by application of trichloroacetic acid or by intradermal injections of mercurophyllin, the time for healing was shortened by as much as six days, and with surgical wounds there was noted an initial acceleration in the wound healing process and there was consistently obtained a 2-day increment in the rate of wound healing.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

This application is a continuation of Serial No. 565,542, filed February 15, 1956, and Serial No. 671,395, filed July 12, 1957, of which the latter has been abandoned.

We claim:
1. A therapeutic composition useful for wound healing comprising the 3-hydroxypropylamide having the following structural formula:

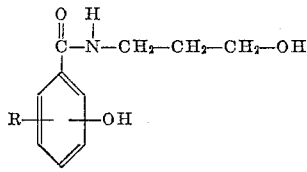

wherein R is a member of the group consisting of hydrogen, hydroxyl, lower alkyl, halogen and aryl, and a pharmaceutical carrier.

2. A therapeutic composition useful for wound healing comprising the 3-hydroxypropylsalicylamide having the following structural formula:

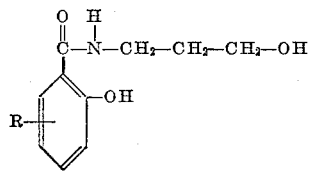

wherein R is a member of the group consisting of hydrogen, hydroxyl, methyl, chlorine, and phenyl, and a pharmaceutical carrier.

3. A therapeutic composition useful for wound healing comprising

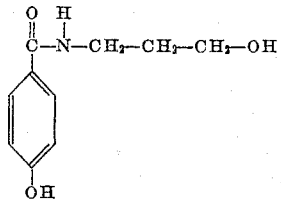

and a pharmaceutical carrier.

4. A therapeutic composition useful for wound healing comprising

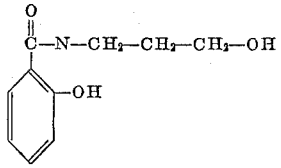

and a pharmaceutical carrier.

References Cited in the file of this patent
UNITED STATES PATENTS

| | | |
|---|---|---|
| 1,990,453 | Hund et al. | Feb. 5, 1935 |
| 2,413,077 | Schnider | Dec. 24, 1946 |

FOREIGN PATENTS

| | | |
|---|---|---|
| 625,727 | Great Britain | July 4, 1949 |

OTHER REFERENCES

"The Effect of Hydroxypropylamides on Wound Healing in Guinea Pigs," Shapiro et al., Arch. int. Pharmacodyn. 112, 221–233 (1957).

Kennedy: (I) The Pharmaceutical Journal, January 3, 1959, pages 5–8.

Kennedy: (II) The Pharmaceutical Journal, January 10, 1959, pages 23–29 (cont'n of (I) above).

Bromer: J. A. Ph. A., Prac. Phy. Ed., vol. 20, No. 7, July 1959, pages 399–401.